US008255593B2

(12) United States Patent
Siddabathuni et al.

(10) Patent No.: US 8,255,593 B2
(45) Date of Patent: Aug. 28, 2012

(54) DIRECT MEMORY ACCESS WITH STRIDING ACROSS MEMORY

(75) Inventors: Ajoy C. Siddabathuni, San Jose, CA (US); Arvind Srinivasan, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 152 days.

(21) Appl. No.: 12/569,173

(22) Filed: Sep. 29, 2009

(65) Prior Publication Data

US 2011/0078342 A1 Mar. 31, 2011

(51) Int. Cl.
*G06F 13/28* (2006.01)
*G06F 13/00* (2006.01)
*G06F 9/26* (2006.01)
(52) U.S. Cl. ........... 710/22; 711/154; 711/157; 711/220
(58) Field of Classification Search ................ 710/1, 22, 710/26; 711/100, 117, 118, 127, 154, 157, 711/200, 201, 219, 220
See application file for complete search history.

(56) References Cited

U.S. PATENT DOCUMENTS

| 4,067,059 | A | 1/1978 | Derchak |
| 4,272,819 | A | 6/1981 | Katsumata |
| 4,878,166 | A | 10/1989 | Johnson |
| 5,301,287 | A | 4/1994 | Herrell |
| 5,450,551 | A | 9/1995 | Amini |
| 5,634,099 | A | 5/1997 | Andrews |
| 7,793,071 | B2 * | 9/2010 | Friedman et al. ............. 711/220 |

* cited by examiner

*Primary Examiner* — Richard B Franklin
(74) *Attorney, Agent, or Firm* — Meyertons, Hood, Kivlin, Kowert & Goetzel, P.C.

(57) ABSTRACT

A DMA device may include an offset determination unit configured to determine a first offset for a DMA transfer and a data transfer unit. The data transfer unit may be configured to receive a first buffer starting address identifying a starting location of a first buffer allocated in memory for the DMA transfer and to generate a first buffer offset address by applying the first offset to the first buffer starting address. The data transfer unit may be further configured to use the first buffer offset address as a starting location in the first buffer for data transferred in the DMA transfer. By applying various offsets, such DMA devices may spread memory access workload across multiple memory controllers, thereby achieving better workload balance and performance in the memory system.

18 Claims, 6 Drawing Sheets

DIRECT MEMORY ACCESS WITH STRIDING ACROSS MEMORY

BACKGROUND OF THE INVENTION

1. Field of the Invention

This invention relates generally to the operation of direct memory access (DMA) operations in computing systems and, more specifically, to a system and method for direct memory access using offsets.

2. Description of the Related Art

Many modern computers and microprocessors allow various hardware subsystems to access system memory directly, that is, without using the central processing unit (CPU) as an intermediary. Direct memory access (DMA) may allow various hardware components, such as disk drive controllers, graphics cards, networking interface controllers, sound cards, or graphical processing units to perform reads and/or writes to memory without occupying the CPU, thereby allowing the CPU to continue to execute other program instructions while a DMA memory access completes. Without DMA, a CPU may be forced to copy each piece of data from a source to destination, during which it would be unavailable for performing other tasks.

For example, a network interface controller may receive network packets from a network connection, store those packets in a local buffer, and then use DMA to move each packet from the local buffer to a buffer in the system memory. For fast packet processing applications, such as a streaming video player for example, the DMA transfer enables the CPU to continue executing packet processing operations on behalf of the application while the network controller concurrently transfers packets to system memory without disturbing the CPU, enabling overall improved packet processing speeds.

In many computer systems, memory is implemented using multiple memory banks. For example, a system may stripe memory across two banks using 64-byte blocks so that every other block is on the same bank (e.g., address 0-63 on bank 1, 64-127 on bank 2, 128-191 on bank 1, etc). Each memory bank may be associated with a unique memory controller, and/or a unique channel of a memory controller, that arbitrates accesses (reads and writes) to memory addresses resident on that bank. In some systems, multiple memory controllers may be employed, each of which is associated with multiple banks of memory.

In many modern computers, bandwidth to memory is an important performance bottleneck. For example, a DMA device may be able to make memory transfer requests to a given memory controller at a rate much greater than that at which the memory controller may be able to satisfy those requests. In such cases, the performance of one or more heavily burdened memory controllers may bottleneck overall system performance.

SUMMARY

According to various embodiments, a direct memory access (DMA) device may be configured to spread memory requests across a multiple memory controllers, memory banks, and/or memory controller channels of a system, so as to avoid performance bottlenecks. In one embodiment, the DMA device may include an offset determination unit configured to determine a first offset for a DMA transfer and a data transfer unit. The data transfer unit may be configured to receive a first buffer starting address identifying a starting location of a first buffer allocated in memory for the DMA transfer and to generate a first buffer offset address by applying the first offset to the first buffer starting address. The data transfer unit may be further configured to use the first buffer offset address as a starting location in the first buffer for data transferred in the DMA transfer. By applying various offsets, such DMA devices may spread memory access workload across multiple memory controllers, thereby achieving better workload balance and performance in the memory system.

Figure 1:
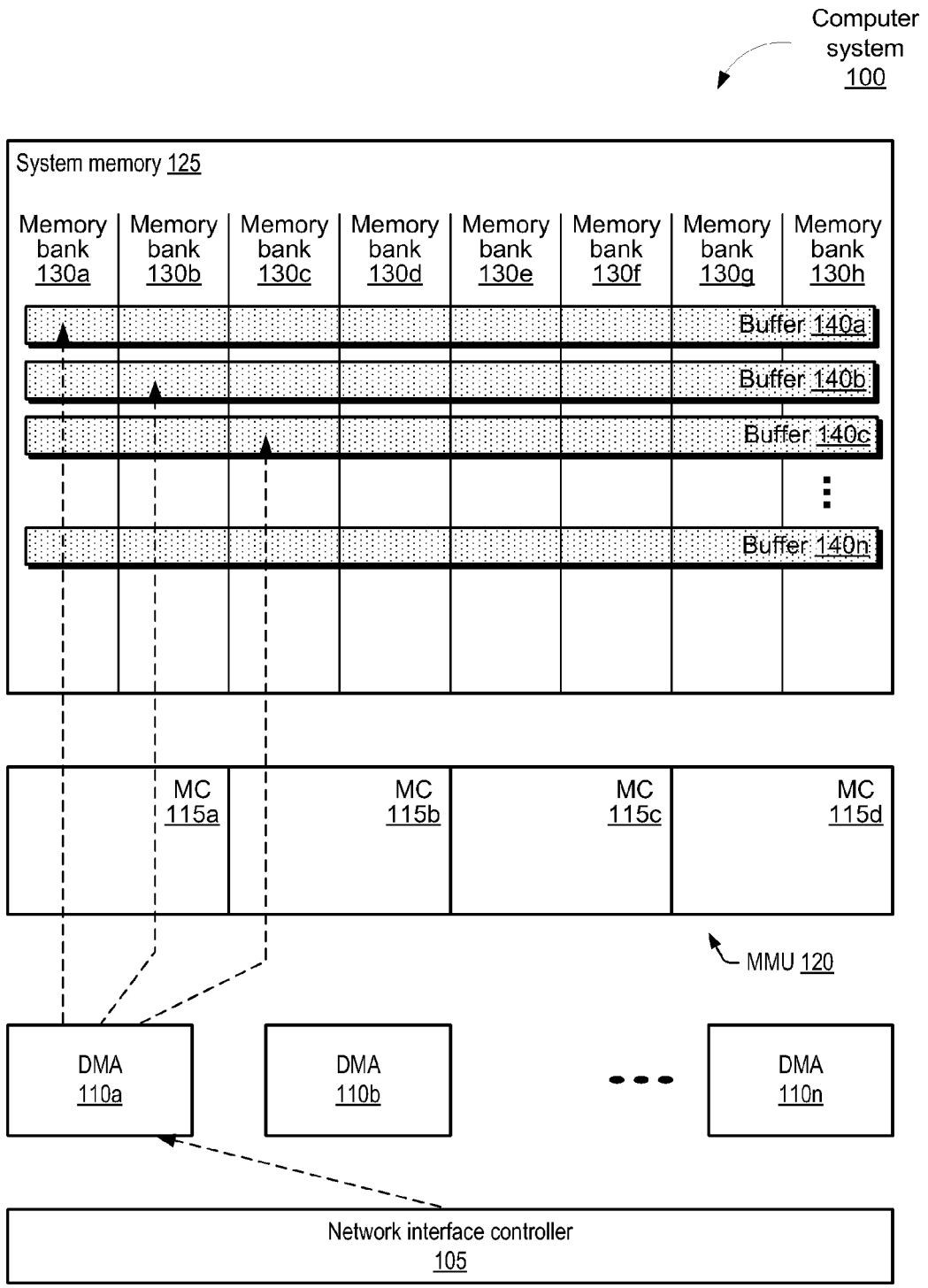
FIG. 1 illustrates a block diagram of a system configured to spread DMA accesses more evenly across a system's memory subsystem, according to some embodiments.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF THE EMBODIMENTS

According to various embodiments, the efficiency of computer systems utilizing DMA may be improved, at least in part, by configuring one or more DMA devices to spread memory requests across the system's memory controllers, memory banks, and/or memory controller channels more uniformly than in traditional implementations. In various embodiments, a system's underlying memory interleaving constraints may be decoupled from the desired packet striding (and landing) offsets, thereby allowing improved network throughput to be attained across a range of underlying memory architectures.

Consider, for example, a network interface controller receiving a stream of network packets and using DMA to transfer those packets from the networking port to respective buffers in system memory. For each packet, the DMA engine may obtain a destination buffer starting address (e.g., corresponding to a target memory buffer allocated in system memory) and copy the packet data starting at that address. In a register-based DMA, the processor (e.g., under control of the operating system and/or OS drivers) may directly program the DMA control registers with the destination buffer starting address for the transfer. In a descriptor-based scheme, the processor may store parameters including the destination buffer starting address for the transfer in an in-memory data structure, such as a descriptor ring or list.

In traditional schemes, each buffer may be allocated by the operating system (OS), and the starting address of each may correspond to a given multiple from an initial location. For instance, the starting location of each buffer may correspond to a clean multiple of the platform page size on the system. That is, for example, if each memory page is 4 KB, the operating system may allocate a 4 KB sized buffer for each packet, and the start addresses of successive buffers (to which the DMA would begin storage of packet data for each received network packet) would reside at regular increments of 4K, 8K, 12K, 16K, etc. from an initial location.

Unfortunately, due to the regularity of this buffer spacing, the start of each successive buffer may be mapped to a memory address on the same memory controller, the same bank and/or the same memory channel. Therefore, that same memory controller, bank and/or channel (corresponding to the starting location of each buffer) must be utilized in the storage of packet data for every packet. In some instances where a packet is relatively small, some of the memory controllers, banks and/or channels may not be utilized or accessed at all. The heavily utilized memory controller, bank and/or channel may therefore cause system performance degradation and/or may become a performance bottleneck.

FIG. 1 illustrates a block diagram of a system configured to spread DMA accesses more evenly across a system's memory subsystem, according to some embodiments. According to the illustrated embodiment, computer system 100 comprises a network interface controller (NIC) 105 which may send and/or receive network packets through a network (not shown). NIC 105 may be capable of DMA via direct memory access devices 110a-n. In some embodiments, DMA devices 110a-n may be included as an integrated portion of NIC 105.

In the depicted embodiment, the memory subsystem is arranged such that sequential block addresses are sliced across multiple memory banks 130a-130h. In one embodiment, each block comprises 64 bytes, and thus a total of 512 bytes may be stored across the eight memory banks 130a-130h at sequential block addresses. A respective memory controller 115a-115d of memory management unit (MMU) 120 is provided to control a corresponding pair of the memory banks 130a-130h. It is noted that in other embodiments, more or fewer memory banks and/or memory controllers may be used, and different blocks sizes may be used, depending upon the memory organization. In some embodiments, each memory controller 115a-d may comprise multiple channels and/or lines to facilitate concurrent accesses to the corresponding memory banks.

In one example (as shown by dashed lines), NIC 105 may receive a number of network packets to be transferred to system memory 125 using DMA device 110a. In response to receiving a request to transfer a data packet(s) from NIC 105, DMA device 110a may obtain a location of a respective buffer for each packet. As described above, the buffers may be allocated in system memory 125 by the operating system, and may conform to the page-size of the platform. For example, in a system in which 4 KB buffers are allocated, a first allocated buffer 140a may reside between byte-addressable memory addresses 0 to 4K−1, another allocated buffer 140b between addresses 4K and 8K−1, yet another allocated buffer 140c between addresses 8K and 12K−1, and so on to buffer 140n at another multiple of 4K. Each buffer is thus striped across the eight memory banks, 130a-130h. As was also discussed above, in some embodiments DMA device 110A may obtain the starting location of each buffer from entries in a descriptor ring or descriptor list set up by the operating system and/or by another system mechanism. In other embodiments, the starting buffer locations may be located in hardware registers of the DMA device.

According to the illustrated embodiment, once DMA device 110a has obtained the starting location of the buffer (e.g., 140a-140n) to which a given packet is to be stored, the DMA may apply an offset to the starting location. Each offset may be chosen to target various starting addresses such that the memory access workload generated by DMA device 110a due to the transfer of multiple packets may be spread more evenly across the system's memory controllers, banks and/or channels. This technique may be referred to herein as packet striding.

In the illustrated embodiment, DMA device 110a applies an offset to each received packet, such that different packets may be stored starting at locations of the respective buffers that correspond to different memory banks (130a-130d) and/or different memory controllers (115a-115d). For example, as shown a first packet (to be stored in buffer 140a) is stored beginning at the start of buffer 140a, which corresponds to memory controller 115a and bank 130a. A second packet (to be stored in buffer 140b) is stored starting at an offset of the buffer 140b that corresponds to memory bank 130b. A third packet (to be stored in buffer 140n) is stored starting at an offset of the buffer 140c that corresponds to memory controller 115b and memory bank 130c. Subsequent packets may be stored starting at locations (of other allocated buffers) that correspond to other memory banks 130d-130h. It is noted that although some packets may be relatively large and may require an amount of storage that extends across several or all of the memory banks 130a-130h, other packets may be relatively small and require an amount of storage that involves only one of (or a few of) memory banks 130d-130h.

Thus, since the DMA device(s) may be configured to apply different offsets to different packets, each packet may be stored starting at a different offset inside of its respective buffer, and improved distribution of workload across the memory subsystems memory controllers, banks and/or channel may be attained. Improved throughput to system memory may also be attained. In various embodiments, offsets may be determined based on programmable settings so that when applied, DMA traffic can be optimized for a given hardware and/or software environment, as desired.

While many of the embodiments described herein are concerned with a network controller transferring network packets from a network port to system memory, it is noted that the concepts and techniques for performing DMA transfers using offsets as described herein may be applied to any DMA data transfer. Such scenarios may include transferring data to and/or from disk drive controllers, graphics cards, networking interface controllers, sound cards, graphical processing units, or for inter-processor communication.

Figure 2:
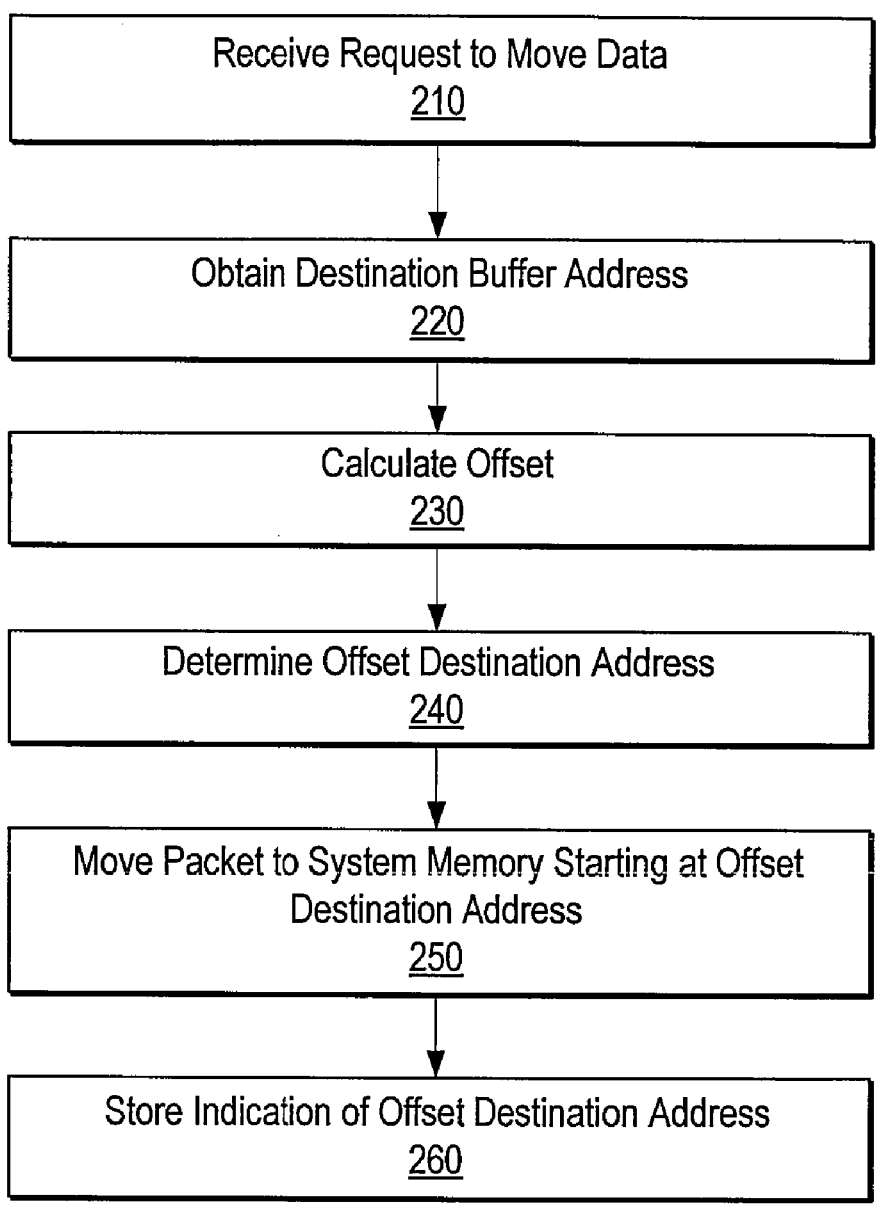
FIG. 2 illustrates a method for transferring data using direct memory access with offsets, according to one embodiment.

FIG. 2 illustrates a method for transferring data using direct memory access with offsets, according to one embodiment. The method may be executed by a DMA device, such as 110a-110n in FIG. 1.

Referring collectively to FIGS. 1 and 2, in some embodiments, before the method is initiated, a preliminary setup step may be performed to configure one or more DMA devices 110a-n to perform the direct memory access of method 200. For example, in some embodiments, the operating system and/or driver software may set up a data structure in memory (e.g., a descriptor ring) that indicates how the transfer(s)

should be handled. In some embodiments, each data transfer (e.g., a packet transfer) may be defined by a respective descriptor in a descriptor list, descriptor ring, or in another data structure. In some embodiments, the data structure may indicate the starting location of one or more target memory buffers to which the DMA is to transfer the data. In various embodiments, a plurality of the DMA devices 110a-n may be set up in 200 (e.g., DMA device 110a), such as by creating a plurality of respective descriptor rings (or other data structures).

According to the illustrated embodiment, a DMA device (e.g., DMA device 110a) may receive a request to move data via direct memory access, as in 210. Such a request may come from, for example, network interface controller 105 and may indicate that a given packet or plurality of packets in a network buffer is to be moved to system memory. For example, a network controller, or other device, may begin to receive a plurality of packets and store them in a local buffer. Once a sufficient number of bytes of a current packet are received, the network controller may provide the request to the DMA device.

Upon receipt of the request, the DMA device may obtain in 220 a destination buffer starting address identifying a starting location of a buffer allocated in memory to which the packet data for a given packet is to be transferred. As discussed above, the DMA device may obtain the destination buffer starting address for a given packet by accessing a register or a data structure such as a descriptor ring programmed by, for example, the operating system or a driver.

According to the illustrated embodiment, the DMA device may then calculate an offset, as in 230 and determine a buffer offset address for the data transfer, as in 240, dependent on the offset and the original destination buffer starting address. For example, in some embodiments, the buffer offset address may be calculated by adding a determined offset to the buffer starting address to thereby form an address that is offset from the beginning of the allocated buffer. According to the illustrated embodiment, the DMA device may then transfer the packet data in 250 starting at the buffer offset address.

In some embodiments, as in 260, the DMA may subsequently provide an indication of the destination buffer offset address of each data packet that is transferred to system memory. In this way, the DMA device may accommodate communication of the buffer offset address of each data packet to the operating system and/or software drivers to allow subsequent retrieval and processing of the packets. In some embodiments, this may be achieved by writing the buffer offset address to one or more data structure in memory (e.g., descriptor rings or lists) that may subsequently be accessed by the operating system.

As described earlier, the offset determined in 240 may be chosen as to spread multiple transfers more evenly across the system's memory controllers and/or memory banks and/or memory channels. For example, each offset may be chosen based on the offset applied to the previous packet. In one such embodiment, if a first DMA operation is performed for a first packet at a starting location corresponding to a first memory controller and/or a first memory bank, then for the subsequent DMA operation involving a different packet, the DMA device may apply an offset such that the subsequent DMA operation stores the packet data at a starting location corresponding to a different memory controller and/or bank.

In various embodiments, a system may comprise any number of memory banks, memory controllers, and/or memory controller channels. A DMA device may be configured to choose offsets to spread DMA operations across any number of these banks, controllers and/or channels. For example, if a system comprises eight memory banks, each with a respective memory controller, a DMA device may apply a different offset to each of eight consecutive data packet transfers.

In various embodiments, the offset scheme used by the DMA device may be configurable, for example, by a software driver. For instance, a driver for a given device and/or application may configure the DMA device to use eight different offsets, each 64-byte intervals apart, while a driver for a different device and/or application may configure the DMA device to use offsets that are each 256 bytes apart, as desired.

In various embodiments, any combination of application-specific and/or hardware-specific factors may be considered when configuring the DMA device for offsetting data transfers. For example, assume that a memory subsystem contains only four memory controllers as discussed above, each controlling accesses to a corresponding pair of memory banks connected through separate channels, and that the system uses a 64-byte memory block size (i.e., each successive 64-byte block is mapped to a different memory bank). The operating system or a driver executing on such a system may configure the DMA device to spread successive packets around eight different offsets, each offset separated by 64 bytes (e.g., 0, 64, 128, 192, etc.). In another scenario, for example, if it is anticipated that 128-byte network packets may generally be received, then it may be advantageous to configure the DMA to separate each offset by 128 bytes. It is noted that the offsets may be chosen in a variety of different ways, as desired, and may depend upon both implementation and system considerations. In some embodiments, the offset for each packet may be chosen on a random (or quasi-random) basis. Further details regarding one specific implementation of a DMA device are discussed below.

Figure 3:
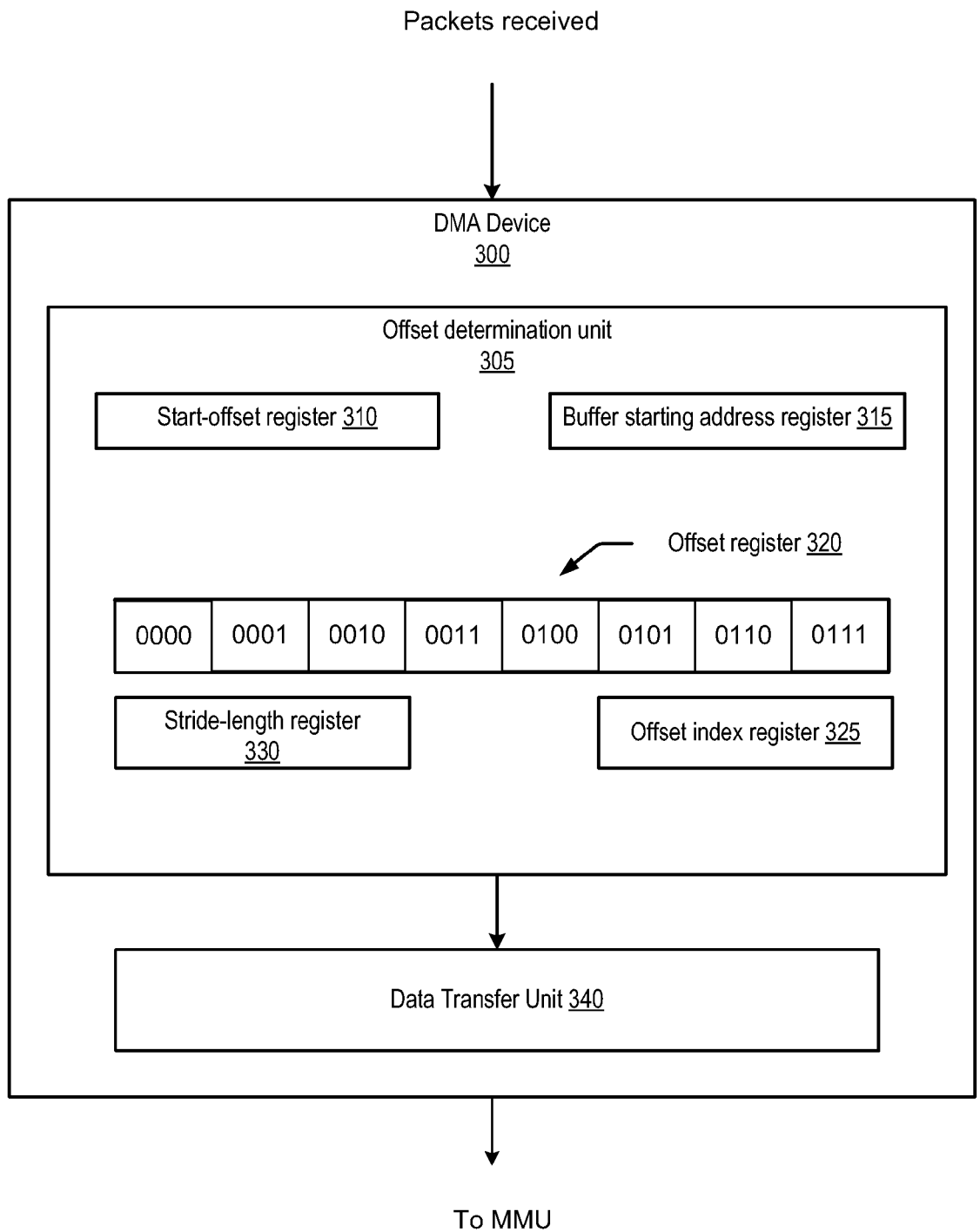
FIG. 3 is a block diagram illustrating a DMA device configured to implement transfers with offsetting (e.g., packet striding), according to some embodiments.

FIG. 3 is a block diagram illustrating a DMA device 300 (illustrative of any of the DMA devices 110a-110n of FIG. 1) configured to implement data packet transfers with offsetting, according to some embodiments. In one embodiment, DMA device 300 may comprise an offset determination unit 305 for determining an offset for each DMA data packet transfer and a data transfer unit 340 configured to interact with memory management unit 120 to cause the actual transfer data forming each packet data. In particular, in response to receiving a DMA data transfer request, data transfer unit 340 may be configured to obtain a destination buffer starting address as discussed above. A buffer offset address may be then calculated by applying the offset, as determined by offset determination unit 305, to the buffer starting address. Data transfer unit 340 may then transfer data of the data packet, beginning at the calculated buffer offset address.

The offset determination unit 305 may comprise one or more programmable registers, such as 310-325. In various embodiments, these registers may be accessed by the operating system, by software drivers, and/or applications to configure the DMA device for a given hardware and/or software scenario. Each programmable register may hold one or more values and may be configured depending upon the hardware and/or software environment, as desired.

According to the specific embodiment shown in FIG. 3, offset determination unit 305 may comprise a destination address register 315. In some embodiments, destination register 315 may be used to hold the buffer starting address identifying the starting location of a buffer allocated in memory for a given packet. As discussed above, the destination buffer starting address may be obtained from, for example, a descriptor ring set up by the operating system.

In the illustrated embodiment, offset determination unit 305 further comprises a start-offset register 310. In some embodiments, start-offset register 310 may contain the value of the offset buffer address to be applied to a given DMA data transfer. That is, in some embodiments, start-offset register 310 may contain the full destination buffer offset address (i.e., calculated by adding the offset to the buffer starting address). For example, if the destination buffer starting address is at memory byte address 512 and a 64-byte offset is to be applied, start-offset register 310 may contain the value 576. In other embodiments, start-offset register 310 may contain only an offset value (e.g., 64) for a given packet transfer. In such embodiments, the final buffer offset destination address may be calculated by incrementing the value in buffer starting address register 315 by the value in start-offset register 310. In other embodiments, a multiplier value may be applied to the start-offset register in order to determine a final offset buffer address.

Offset determination unit 305 may further comprise offset register 320. Offset register 320 may define a set of offset values that the DMA device may use in calculating a given offset to be applied for a given packet transfer. For example, in one embodiment, offset register 320 may be a 32-bit programmable register, which may be interpreted as eight 4-bit values. In such an embodiment, each 4-bit value may be interpreted in binary as a number between 0-15. Each 4-bit value may be multiplied by a given stride length to determine an offset. The stride length may be specified in another programmable register, such as stride-length register 330. The operating system, software driver or an application may configure offset register 320, for example, to contain the values 0 through 7 and the stride length register to contain the value 64. In such a case, the DMA device may apply any of eight defined offsets to a DMA data transfer, as shown in the following table:

| Offset Reg. | Stride-Length Reg. | Offset |
|---|---|---|
| 0 | 64 | 0 |
| 1 | 64 | 64 |
| 2 | 64 | 128 |
| ... | | |
| 7 | 64 | 448 |

In various embodiments, an offset index register, such as register 325, may be used to select which of the plurality of offset values specified in offset register 320 should be used for a given packet (or other DMA transfer). In one embodiment, offset index register 325 may be implemented as a counter which increments following each packet transfer. For example, offset index register 325 may be implemented as a 3-bit counter that increments from 0 to 7 with wrap-around. During operation, the value in offset index register 325 may point to any one of the eight offset values specified in offset register 320. Thus, for example, for a first packet, the value in offset index register 325 may point to the first value (e.g., "0000") of offset register 320, and this first value may be multiplied by the stride length value in register 330 to derive a buffer offset to be used in the transfer of the first packet. For the transfer of a second packet, since the value in offset index register 325 is incremented and thus points to the next offset specified in offset register 320 (e.g., "0001"), a different buffer offset is derived for the second packet, and so on. In this manner, differing offsets may be determined for the transfer of packet data corresponding to different packets.

As described above, any combination of hardware and/or software factors may be considered when configuring offset register 320 and stride-length register 330. For example, one consideration may be the size of the DMA transfers that an application expects to make. If it is anticipated, for example, that a network interface controller might generally receive 64-byte packets, then a stride length of 64-bytes may be desirable. However, if it is anticipated the network interface controller might instead generally receive 128-byte packets, then a stride length of 128 may result in even better performance. In some embodiments, improved performance may be attained by configuring offset register 320 to hold non-consecutive values. For example, offset register 320 may concurrently hold the values 0, 2, 4 . . . 14. In such a case, the distance between each offset would be twice the length defined by the stride length register.

In some embodiments, the values in offset register 320 need not be unique from one another. For example, in a system wherein the memory subsystem contains only two memory controllers, each with two banks, the offset register 320 may be programmed to contain only four unique values (e.g., 0, 1, 2, 3, 0, 1, 2, 3).

In some embodiments, it may be preferable to set the stride length depending on the layout of the memory banks in the system. For example, the operating system or a driver may configure each offset defined by offset register 320 and/or stride-length register 330 to correspond to a different memory banks.

In some embodiments, the offset registers may likewise be configured to create offsets that correspond to separate cache indexes. In such embodiments, total memory bandwidth in the system may be improved. Moreover, the likelihood of a conflict miss in set-associative data cache implementations may be reduced by spreading packets more evenly across cache lines.

The table below demonstrates one example of a DMA device configuration with offsets, as described herein.

| Offset-Reg | Stride-Reg | Offset | $Line | MC | Channel | Packet Number |
|---|---|---|---|---|---|---|
| 0000 | 64 | 0 | 0 | 0 | 0 | 0, 8, 16 . . . |
| 0001 | 64 | 64 | 1 | 0 | 1 | 1, 9, 17 . . . |
| 0010 | 64 | 128 | 2 | 1 | 0 | 2, 10, 18 . . . |
| 0011 | 64 | 192 | 3 | 1 | 1 | 3, 11, 19 . . . |
| 0100 | 64 | 256 | 4 | 2 | 0 | 4, 12, 20 . . . |
| 0101 | 64 | 320 | 5 | 2 | 1 | 5, 13, 21 . . . |
| 0110 | 64 | 384 | 6 | 3 | 0 | 6, 14, 22 . . . |
| 0111 | 64 | 448 | 7 | 3 | 1 | 7, 15, 23 . . . |

In the example above, eight offsets are defined in offset register 320. These are listed in binary in the Offset-Reg column and signify the numbers 0 through 7. In the example configuration, a stride length of 64 bytes is specified in stride-length register 330. The calculated offset resulting by the combination of the offset register and stride-length register value for each packet is listed in the column "Offset". In this embodiment, the two values are combined by multiplication. Since the example system uses a 64-byte cache block, each offset maps to a different cache line, as indicated by the "$Line" column.

The example system contains four memory controllers, each with two banks with corresponding channels. In this packet striding configuration example, the memory banks are arranged so that each 64-byte block is mapped to a channel of a memory controller. As indicated in the table above, the first 64 bytes handled by channel 0 of memory controller 0 of the example system, the next 64 bytes by channel 1 of memory controller 0, the next 64 bytes by channel 0 of memory controller 1, and so on.

In the illustrated embodiment, the DMA device is configured to apply the defined offsets in succession, one to each successive incoming packet. For example, as indicated, the DMA applies the first offset (0) to the first packet (numbered 0), the second offset (64) to the second received packet (numbered 1), and so forth. Once eight packets have been received, the DMA device may cycle back to the first offset and repeat. For example, the offset 0 is applied in this example to packet 8.

In some embodiments, for each DMA transfer, offset determination unit 305 may determine an offset, as in 220 of FIG. 2, by choosing an offset value from offset register 320, multiplying it by the value of stride-length register 330, and storing the result in start-offset register 310. In some embodiments, data transfer unit 340 may then perform the DMA data transfer to the final destination buffer offset address, which may be defined as the destination buffer's start address plus the calculated offset. As described above, in some embodiments, the final destination buffer offset address may alternatively be stored in the start-offset register 310. In various embodiments, more or fewer registers may be used to determine the offsets that a DMA device may apply to each transfer.

Although the DMA device may cycle through offsets as shown in the table above, in other embodiments, the DMA device may employ various other methods for choosing an offset. For example, in one embodiment, the DMA device may choose an arbitrary offset from the set of possible offsets specified in offset register 320.

In other embodiments, an offset determination unit, such as 305, may not explicitly store a set of possible offsets to be selected from. For example, an offset determination unit may determine an offset based, at least in part, on the address of the destination buffer starting address for a given packet. In one such embodiment, the offset determination unit may calculate a hash function of the destination buffer starting address and use that as the offset. This approach may be preferable, for example, when the size of each DMA transfer is unknown, such as may happen with network controllers receiving packets from a network. In various embodiments, a hash function may be applied to any of the bits in the destination buffer's address. In other possible embodiments, a hash of the buffer starting address may be used as an index into a list of offsets, such as those that may be defined in offset register 320. That is, in some embodiments, the hash value of the buffer starting address may be written to offset index register 325 and/or used as an index to select from among the offset values defined by offset register 320.

In yet further embodiments, the offset determination unit may determine an offset (or offset index) by hashing one or more other values associated with the data being transferred. For example, if the DMA device is transferring an IP packet, then it may calculate a hash function of one or more packet headers. Again, the hashed value may be used to determine an offset for the DMA transfer or to choose from a list of predefined offsets. In various embodiments, the hash functions described in these examples may be calculated by the DMA device itself according to its configuration by the driver/OS software.

In the case wherein an application or driver uses multiple DMA devices to perform numerous transfers, the offsets used by a given DMA device may be dependent on the offsets that one or more other DMA devices are configured to use. For example, if a memory system contains 16 memory banks, one DMA device may be configured to use a given set of 8 offsets and another DMA device may be configured to use a different set of 8 offsets. In some embodiments, the DMA may be configured to use an offset based, at least in part, on an identification number associated with the DMA device. In this manner, DMA transfer workload may be distributed across memory controllers by using multiple DMA devices, each associated with different identification numbers and therefore, using different offsets. This also allows, where required, fine grain placement of DMA/packet traffic across the available memory banks/channels/controllers, in effect also providing some level of protection from another DMA, or other key systems' data structures, from interference with each other In some embodiments, one or more offset-capable DMA devices may be integrated into a processor. In some embodiments, one or more offset-capable DMA devices may be decoupled from the processor, such as by being integrated into a hardware component, such as a network interface card. The card may be a plug-in type component or integrated into a motherboard.

The values in offset register 320 and stride-length register 330 thus need not be the same across multiple DMA devices in the system. Many computer systems may contain multiple DMA devices, any number of which may be used by a given application and/or driver. As described above, in such embodiments, one DMA device may be configured to use a given set of offsets while another DMA device is configured to use a different set of offsets. For example, if it is anticipated that a NIC may receive packets of various sizes, it may use a first DMA device (configured with a longer stride length) to transfer the larger packets while using a second DMA device (configured with shorter stride lengths) to transfer smaller packets. In other words, it may be possible to anticipate a certain small packet range on a given DMA based on packet types, such as video or short audio packets vs. full length data (ftp) packets. Therefore, one could configure the network interface such that some DMAs (anticipated to receive video/audio packets) are programmed with one set of parameters to cater to short packets, while other DMAs (anticipated to receive other packet types) are programmed with a different set of offset determination parameters.

Figure 4:
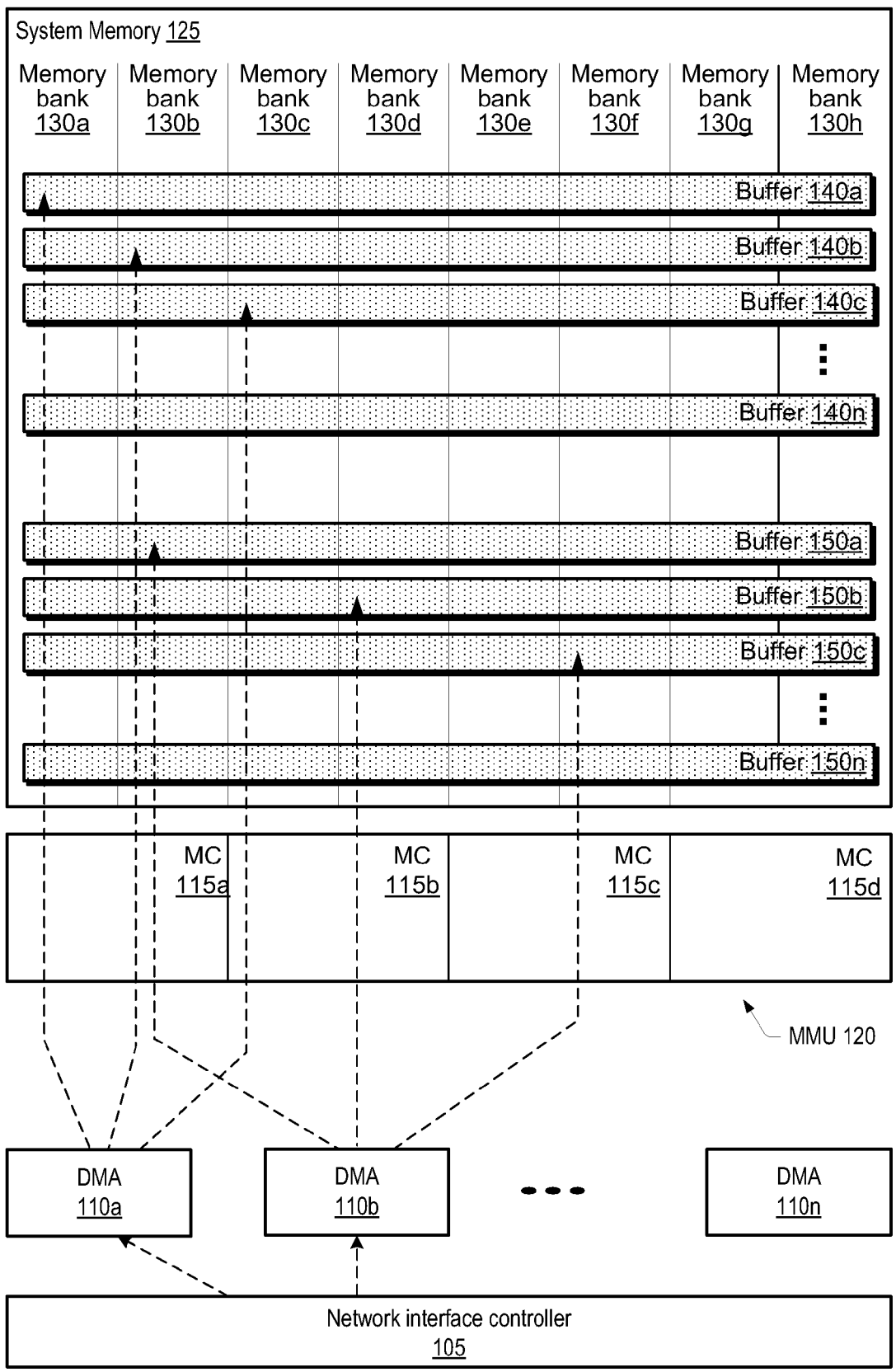
FIG. 4 is a block diagram illustrating a system configured to spread DMA accesses across a system's memory subsystem using multiple DMA units, according to some embodiments.

FIG. 4 is a block diagram illustrating a system configured to spread DMA accesses across a memory subsystem using multiple DMA units, according to some embodiments. Components of FIG. 4 that are analogous to those of FIG. 1 are similarly numbered to facilitate understanding. According to the illustrated embodiment, NIC 105 may configure DMA 110*a* to store packets to buffers 140*a*-140*n*, as in FIG. 1. In addition, NIC 105 may also configure DMA 110*b* to store packets in buffers 150*a*-150*n*, as illustrated. According to the illustrated embodiment, DMA 110*b* may be configured to use different offsets (i.e., a different packet striding scheme) than that of DMA 110*a*. In the illustrated embodiment, DMA 110*b* is configured to apply an offset to a first packet, such that the start of the first packet is stored in a location of buffer 150*a* that corresponds to memory bank 130*b* controlled by memory controller 115*a*. According to the illustrated embodiment, DMA 110*b* may be configured to apply an offset to a second packet, such that the start of the second packet is stored in a location of buffer 150*b* that corresponds to memory bank 130*d* controlled by memory controller 115*b*. The start of the next packet may similarly be stored at a location at memory buffer 150*c* that corresponds to memory bank 130*f* controlled by memory controller 115*c*, and so on. Thus, in systems with multiple DMA units, each unit may be configured such that the aggregate memory workload across the multiple DMA units is spread across multiple memory controllers as to alleviate performance bottlenecks.

Figure 5:
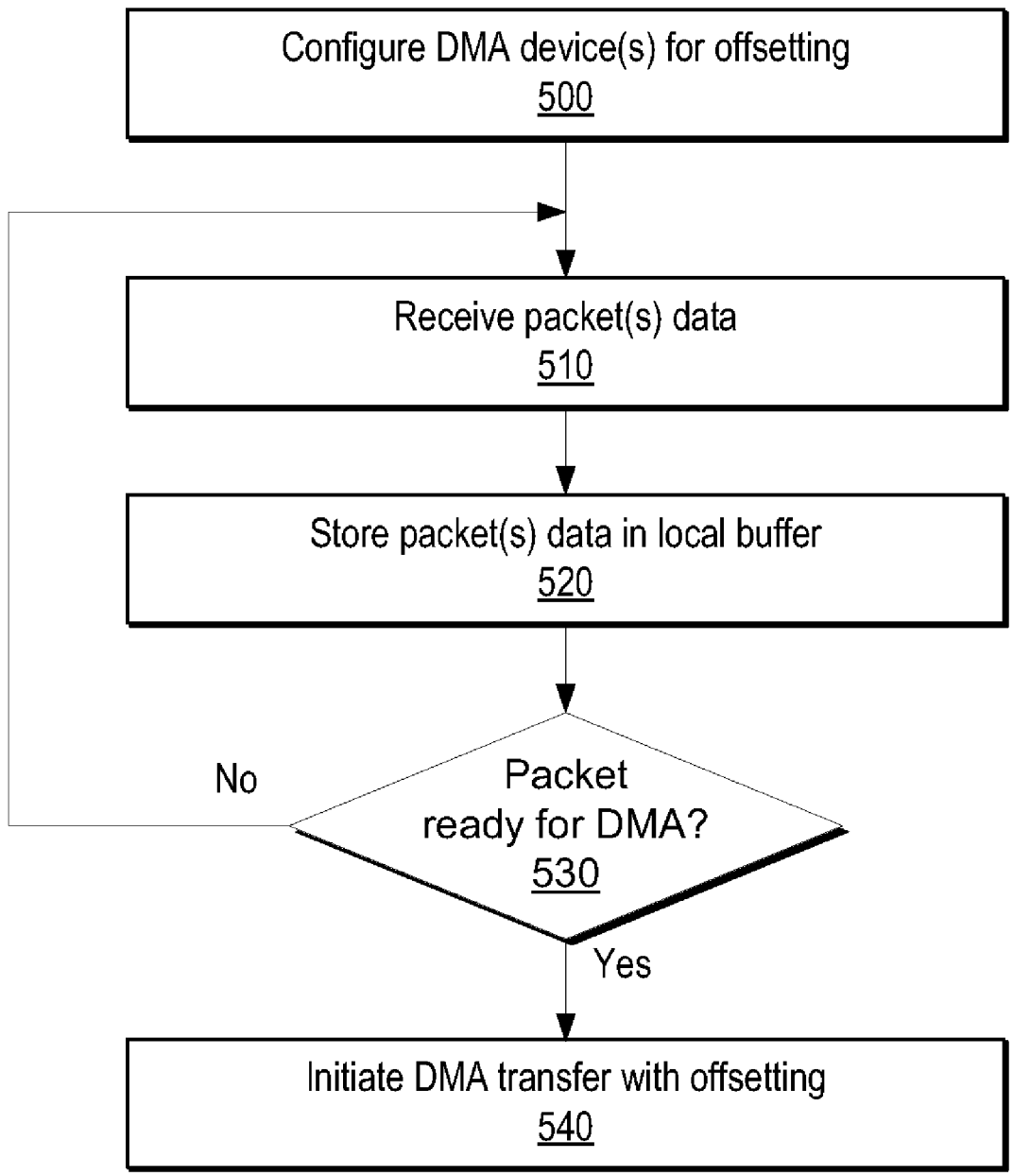
FIG. 5 is a flowchart illustrating one method for using offset-enabled DMA devices to perform direct memory access with offsets, according to some embodiments.

FIG. 5 is a flowchart illustrating one method for using offset-enabled DMA devices to perform direct memory access with offsets, according to some embodiments. The illustrated embodiment may be performed in association with a software driver for a network interface card configured to receive network packets on a network port and transfer them to main memory to be accessed by a packet processing application.

The illustrated method begins when the driver configures one or more DMA devices (e.g., device 300 of FIG. 3) to perform direct memory access with offsetting, as described above. In 500, the driver may configure one or more DMA devices by storing desired values into the programmable registers of each device (e.g., offset register 320, stride-length register 330, etc.). In this phase, the driver may consider application and/or hardware specific factors, such as the expected packet size, the number of memory controllers, the number of channels per memory controller, the memory bank layout, the memory block size in the system, cache layouts, and other factors, as described above.

Network packet data may then be received, as in 510, and stored in the NIC's local buffer, as in 520. Once the packet is ready (e.g., a sufficient number of bytes have been stored in the local buffer), as in the affirmative exit from 530, then the NIC may initiate a DMA transfer, using a designated DMA device (e.g., 550). Since the DMA device is configured to perform offsetting as described above, the memory transfers for different packets may be performed in a manner that spreads memory accesses across multiple memory controllers and banks in a distributed fashion. In some embodiments, step 540 may comprise multiple DMA devices performing method 200 of FIG. 2 concurrently.

Figure 6:
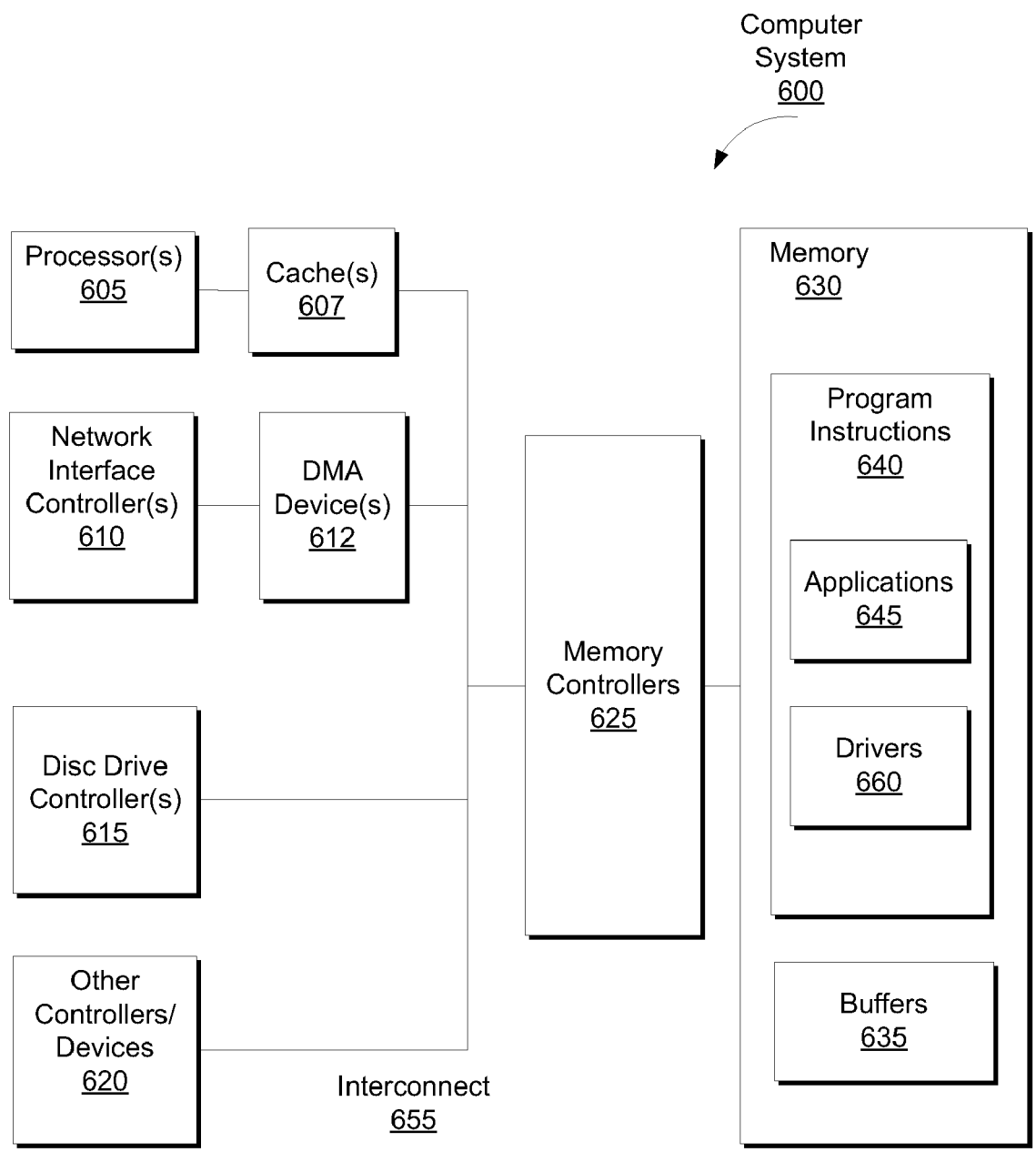
FIG. 6 is a block diagram illustrating one embodiment of a computer system 600 configured to implement direct memory access with offsets, as described herein.

FIG. 6 is a block diagram illustrating one embodiment of a computer system 600 configured to implement direct memory access with offsets, as described herein. The computer system may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The illustrated embodiment comprises one or more processors 605, each possibly containing multiple cores. Each processor may be capable of simultaneous multi-threading (SMT), in which case, it may comprise two or more logical processors. Each processor 605 may comprise one or more memory caches and/or be coupled to one or more memory caches 607. Caches may be arranged hierarchically and comprise multiple levels. Each cache may be associated with a memory block size and may be implemented with various degrees of associativity. As described herein, DMA devices may be configured to store data packets at offset starting memory locations that correspond to different cache lines. In such embodiments, throughput to memory and/or cache hit rates may be maximized.

System 600 also comprises one or more network interface controllers (NICs) 610, disk drive controllers 615 (e.g. optical storage, magnetic storage, hard drive, tape drive, solid state memory, etc), and any number of other peripheral devices 620 (e.g., graphics cards, audio cards, etc). In some embodiments, NIC 610 may be integrated onto a motherboard while in others, NIC 610 may be implemented as a plug-in device. NIC 610 may implement any of various types of networking ports, such as an Ethernet port, Gigabit Ethernet port, Infiniband™ port, or others, for sending and/or receiving network packets (such as IP packets) as described herein.

In the illustrated embodiment, NIC 610 may perform direct memory access using one or more DMA devices 612 (e.g., configured in accordance with DMA device 300 of FIG. 3). In the illustrated embodiment, DMA devices 612 may be integrated into NIC 610 or into a motherboard. In other embodiments, NIC 610 may use DMA devices integrated into processors 605 rather than its own DMA devices 612 in order to perform direct memory access with offsets, as described herein. DMA devices 612 may comprise one or more programmable registers (such as registers 310-330 of FIG. 3) for implementing DMA with offsets, as described herein.

NIC 610 may utilize DMA devices 612 to write and read data to and from buffers 635 in one or more system memories 630, as described herein. System memory may comprise one or more of cache, SRAM, DRAM, RDRAM, EDO RAM, DDR 10 RAM, SDRAM, Rambus RAM, EEPROM, or similar mechanisms. System memory 630 may comprise multiple memory banks. In some embodiments, memory address space may be striped across memory banks, as described above.

To perform direct memory access operations, DMA devices 612 may access memory via one or more memory controllers 625. In various embodiments, each memory controller may comprise multiple channels, each coupled to a unique memory bank or channel. In various embodiments, DMA devices 612 may be configured to distribute direct memory access operations across numerous memory controllers 625, thereby enabling greater memory throughput.

In addition to memory buffers 635, system memory 630 may include program instructions 650. Program instructions 650 may comprise one or more applications 645, shared libraries, operating systems, or software drivers 650 as described herein. Program instructions 650 may be encoded in platform native binary, any interpreted language such as Java™ byte-code, or in any other language such as C/C++, Java™, etc or any combination thereof.

The program instructions 650 may include software drivers configured to access control the operation of devices such as NIC 610, disc drive controller 615, and/or other devices 620. Software drivers may configure DMA devices 612 and/or other DMA devices to perform direct memory access using offsets, as described herein. For example, drivers 650 may modify values in one or more programmable registers of the DMA devices 612 (e.g., programmable registers 310-330 of FIG. 3). Drivers 650 may configure devices (e.g., NIC 610) to utilize multiple DMA devices concurrently, as described herein.

The system components may be connected via one or more interconnects 655. Interconnects 650 may be implemented as any broadcast, point-to-point, or hybrid communication mechanism such as a front side bus, Ethernet, InfiniBand™, etc.

Applications and/or drivers capable of configuring a DMA device to perform DMA data transfers with offsetting, as described herein, may be provided as a computer program product, or software, that may include a computer-readable storage medium having stored thereon instructions, which may be used to program a computer system (or other electronic devices) to perform a process according to various embodiments described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

Although the embodiments above have been described in considerable detail, numerous variations and modifications will become apparent to those skilled in the art once the above disclosure is fully appreciated. For example, although many of the embodiments are described in terms of a network interface card storing incoming network packets, it should be noted that the techniques and mechanisms disclosed herein may be applicable in many other contexts, such as disk drive controllers and/or inter-processor communication. It is intended that the following claims be interpreted to embrace all such variations and modifications.

What is claimed:

1. A direct memory access (DMA) device comprising:
an offset determination unit configured to determine an offset for a DMA transfer from among a plurality of predetermined offsets; and
a data transfer unit configured to:
receive a buffer starting address identifying a starting location of a buffer allocated in memory for the DMA transfer;
generate a buffer offset address by applying the offset to the buffer starting address; and
use the buffer offset address as a starting location in the buffer for data transferred in the DMA transfer;
wherein:
the offset determination unit comprises one or more programmable registers; and
the plurality of predetermined offsets is stored in the one or more programmable registers.

2. The device of claim 1, wherein the data transfer unit is configured to write data associated with the DMA transfer at sequential locations of the buffer beginning at the buffer offset address.

3. The device of claim 1, wherein the data transfer unit is configured to write a data packet into the buffer using the buffer offset address as a starting location.

4. The device of claim 3, wherein the offset determination unit is configured to determine a second offset from among the plurality of predetermined offsets for a second data packet that is different than the offset, and wherein the data transfer unit is further configured to receive a second buffer starting address identifying a starting location of a second buffer allocated in memory for the second packet and is configured to generate a second buffer offset address by applying the second offset to the second buffer starting address.

5. The device of claim 4, wherein the data transfer unit is further configured to write a second data packet into the second buffer using the second buffer offset address as a starting location.

6. The device of claim 1, further comprising:
an offset register programmable to store a plurality of offset values concurrently;
wherein the offset determination unit is configured to determine the offset based on an offset value selected within the offset register, wherein the selected offset value depends upon a result of a hash function.

7. A direct memory access (DMA) device comprising:
an offset determination unit configured to determine an offset for a DMA transfer from among a plurality of predetermined offsets;
a data transfer unit configured to:
receive a buffer starting address identifying a starting location of a buffer allocated in memory for the DMA transfer;
generate a buffer offset address by applying the offset to the buffer starting address;
use the buffer offset address as a starting location in the buffer for data transferred in the DMA transfer;
an offset register programmable to store a plurality of offset values concurrently; and
an offset index register configured to store an index value;
wherein the offset determination unit is configured to determine the offset by selecting an offset value from the offset value register using the index value, and by calculating the offset using the selected offset value.

8. The device of claim 7, further comprising a programmable stride-length register configured to store a stride value;
wherein the offset determination unit is configured to calculate the offset by multiplying the selected offset value by the stride value.

9. The device of claim 8, wherein the offset index register comprises a counter, wherein the index value is incremented upon successive packet transfers.

10. A method of operating a DMA device comprising:
receiving a buffer starting address identifying a starting location of a buffer allocated in memory for a DMA transfer;
storing a plurality of predetermined offsets in one or more programmable registers;
determining an offset for the DMA transfer from among the plurality of predetermined offsets;
generating a buffer offset address by applying the offset to the buffer starting address; and
using the buffer offset address as a starting location in the buffer to perform the DMA transfer.

11. The method of claim 10, wherein the offset is dependent on the starting address.

12. The method of claim 10, wherein the DMA transfer includes writing a data packet into the buffer using the buffer offset address as a starting location.

13. The method of claim 12, further comprising:
receiving a second buffer starting address identifying a starting location of a second buffer allocated in memory for a second packet;
determining a second offset for the second data packet that is different than the offset;
generating a second buffer offset address by applying the second offset to the second buffer starting address; and
writing the second data packet into the second buffer using the second buffer offset address as a starting location.

14. A computer system comprising:
one or more processors;
a memory subsystem coupled to the one or more processors though one or more memory controllers, the memory subsystem comprising multiple banks of memory; and
a direct memory access (DMA) device comprising:
an offset determination unit configured to determine a offset for a DMA transfer from among a plurality of predetermined offsets;
a data transfer unit configured to:
receive a buffer starting address identifying a starting location of a buffer allocated in memory for the DMA transfer;
generate a buffer offset address by applying the offset to the buffer starting address; and
use the buffer offset address as a starting location in the buffer for data transferred in the DMA transfer;

an offset register programmable to store a plurality of offset values concurrent; and an offset index register configured to store an index value;

wherein the offset determination unit is configured to determine the offset by selecting an offset value from the offset value register using the index value, and by calculating the offset using the selected offset value.

15. The system of claim 14, wherein the DMA device further comprises:

a programmable stride-length register configured to store a stride value;

wherein the offset determination unit is configured to calculate the offset by multiplying the selected offset value by the stride value.

16. The system of claim 15, wherein the offset index register comprises a counter, wherein the index value is incremented upon successive packet transfers.

17. A computer system comprising:

one or more processors;

a memory subsystem coupled to the one or more processors though one or more memory controllers, the memory subsystem comprising multiple banks of memory; and a direct memory access (DMA) device comprising:

an offset determination unit configured to determine a offset for a DMA transfer from among a plurality of predetermined offsets;

a data transfer unit configured to:

receive a buffer starting address identifying a starting location of a buffer allocated in memory for the DMA transfer;

generate a buffer offset address by applying the offset to the buffer starting address; and use the buffer offset address as a starting location in the buffer for data transferred in the DMA transfer; and an offset register programmable to store a plurality of offset values concurrently;

wherein the offset determination unit is configured to determine the offset based on an offset value selected within the offset register, wherein the selected offset value depends upon a result of a hash function.

18. The system of claim 17, wherein the data transfer unit is configured to write data associated with the DMA transfer at sequential locations of the buffer beginning at the buffer offset address.

* * * * *